United States Patent [19]

Streu et al.

[11] Patent Number: 4,778,830
[45] Date of Patent: Oct. 18, 1988

[54] POLYESTER POLYOLS LIQUID AT ROOM TEMPERATURE AND THEIR PREPARATION AND USE IN PREPARING PLASTICS BY POLYISOCYANATE ADDITION POLYMERIZATION

[75] Inventors: Joachim Streu, Diepholz; Matthias Marx, Fuerstenfeldbruck; Peter Weyland, Frankenthal, all of Fed. Rep. of Germany; Dietrich Scherzer, Nottingham, United Kingdom; Wolfgang Straehle, Heidelberg, Fed. Rep. of Germany

[73] Assignee: BASF Aktiengesellschaft, Ludwigshafen, Fed. Rep. of Germany

[21] Appl. No.: 127,270

[22] Filed: Dec. 1, 1987

[30] Foreign Application Priority Data

Dec. 13, 1986 [DE] Fed. Rep. of Germany ....... 3642667

[51] Int. Cl.⁴ ............................................. C08G 18/14
[52] U.S. Cl. .................................... 521/172; 521/173; 528/83; 528/272; 528/302; 560/190; 560/202
[58] Field of Search .................. 521/172, 173; 528/83, 528/272, 302; 560/190, 202

[56] References Cited
U.S. PATENT DOCUMENTS 4,052,358 10/1977 Wada et al. ..................... 528/176
4,362,825 12/1982 Grabhoefer et al. ............... 521/172

Primary Examiner—Maurice J. Welsh
Attorney, Agent, or Firm—John C. Demeter

[57] ABSTRACT

Disclosed are polyester polyols liquid at 25° C., having an average functionality of from 2 to 3, a hydroxyl number of from 25 to 400, an acid number smaller than 10 and a viscosity at 25° C. of from 200 to 10,000 mPas, which contain in bonded form units having at least one of the structures

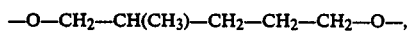

—O—CH₂—CH(CH₃)—CH₂—CH₂—CH₂—O—,

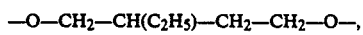

—O—CH₂—CH(C₂H₅)—CH₂—CH₂—O—,

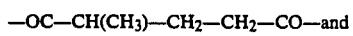

—OC—CH(CH₃)—CH₂—CH₂—CO—and

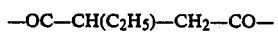

—OC—CH(C₂H₅)—CH₂—CO— which are prepared by the polycondensation or transesterification of 2-methyl-1,5-pentanediol, 2-ethyl-1,4-butanediol, 2-methyl-glutaric acid and/or 2-ethyl succinic acid or their derivatives, optionally while using other organic polycarboxylic acids and multivalent aliphatic alcohols and are useful for preparing non-cellular or cellular polyurethane plastics or polyurethane-polyurea plastics.

20 Claims, No Drawings

POLYESTER POLYOLS LIQUID AT ROOM TEMPERATURE AND THEIR PREPARATION AND USE IN PREPARING PLASTICS BY POLYISOCYANATE ADDITION POLYMERIZATION

BACKGROUND OF THE INVENTION

1. Field of the Invention

The present invention generally relates to polyester polyols that are liquid at room temperature and more particularly to polyester polyols based on 2-methyl1,5-pentanediol; 2-ethyl-1,4-butanediol; 2-methyl glutaric acid and/or 2-ethyl succinic acid.

2. Description of the Relevant Art

The preparation of polyester polyols and their use in the preparation of polyurethane plastics using the polyisocyanates addition polymerization process is well known and is described in numerous literature and patent publications. Examples are found in the *Plastics Handbook*, Volume 7, Polyurethanes, first edition, 1966, edited by A. Hoechtlen and R. Vieweg, and the second edition, 1983, edited by G. Oertel and Carl Hanes Verlag, Munich and Vienna.

Polyester polyols are commonly prepared from polycarboxylic acids and multivalent alcohols by the molten condensation or by the transesterification of dicarboxylic acids in the presence of acids or metal salts as catalysts. Preferably, the polycondensation is carried out under reduced pressure in order to distill off the water resulting from the condensation or in order to distill off the alcohol cleaved off from the reaction mixture. At the same time, the equilibrium reaction is moved in the direction of polyester formation. In this fashion polyester polyols are prepared having acid numbers larger than 5 and with relatively short reaction times.

Although polyester polyols, particularly those based on adipic acids and alkanediols, alkanediol mixtures or mixtures of alkanediols and higher valent alcohols, are used in large quantities for the preparation of polyurethane plastics for a number of areas of applications, the products possess disadvantages. One particular disadvantage is that the polyester polyols either completely or partially crystallize out under normal storage conditions, or they exhibit such a high viscosity that they cannot be processed directly at room temperature using the polyisocyanate addition polymerization process with conventional equipment. The polyester polyols must be routinely melted down in externally protected equipment and homogenized and only then are able to be reacted at high temperatures in costly temperature controlled devices. The preparation of the polyurethane finished articles is in turn made more expensive.

In order to avoid this disadvantage, following the specifications of EPA-No. 017060 for the preparation of polyurethanes elastomers and following the specification of EPA No. 056,122 (U.S. Pat. No. 4,362,825) in preparing flexible polyurethane flexible foams, liquid polyester polyols having hydroxyl numbers of from 40 to 80 are used in certain defined quantity ratios, which are obtained by the polycondensation of organic dicarboxylic acids with.polyol mixtures comprising at least 4 divalent and trivalent alcohols based on 1,4-butanediol, 1,6-hexanediol, 1,5-pentanediol and/or diethylene glycol and an alkanetriol such as glycerine and/or trimethylolpropane. The polyurethane elastomers obtained in this fashion have a favorable cold tolerance and good hydrolysis resistance at a high level of mechanical strength, as well as exhibiting a very good compressive permanent set and the polyurethane flexible foams exhibit both improved hydrolysis resistance and excellent punching ability. Polyol mixtures of this kind are relatively expensive since the starting components are obtained partially by the reduction of the corresponding dicarboxylic acid mixtures, and are only available in limited quantities for the preparation of polyester polyols.

Polyester polyols, prepared by the polycondensation of mixtures comprising succinic, glutaric and adipic acids and multivalent alcohols, preferably aliphatic alcohols, are likewise not new. According to EPA No. 0044969, the products are suited for the preparation of thermoplastic polyurethane elastomers, which have a good mechanical property level, especially improved tensile strength at break and abrasion resistance. According to both Great Britain Patent Nos. 882,603 and 1,475,541, the products are used as starting materials for polyurethane foams.

German Patent No. 3,614,038.4 likewise discloses low viscous polyester polyols, liquid at room temperature, which contain in bonded form units having the structure $-OCH_2-CH(CH_3)-CH_2-CH_2O-$. Plastics prepared from these polyester polyols using the polyisocyanates addition polymerization process, particularly non-cellular or cellular polyurethane elastomer or polyurethane-polyurea elastomers, have a high mechanical property level and good hydrolysis stability.

In addition, disclosed in DE-OS-No. 2609207 (U.S. Pat. No. 4,052,358) are pigmentable unsaturated polyester resin compositions having low shrinkage, which comprise as glycol components a mixture of from 15 to 70 mole percent of neopentyl glycol and from 10 to 30 mole percent of 2,2-bis (4-hydroxycyclohexyl)-propane and where the glycol components additionally can contain from 1 to 15 mole percent of a multivalent alcohol.

Polyurethane elastomers, which are prepared by the reaction of higher molecular polyhydroxyl compounds, for example polyester polyols or polyether polyols, organic polyisocyanates, preferably aromatic diisocyanates and lower molecular chain extending agents, find numerous applications. They are described in numerous patent and literature publications, such as in the abovementioned *Plastics Handbook*, Volume 7, Polyurethanes, or in *Plastics* 68 (1978), pp. 819–825, as well as in the literature references cited therein.

Along with other mechanical properties such as mechanical strength, elongation, elasticity, and the like, polyurethane elastomers are also required to have particularly good hydrolysis resistance and cold stability. These properties are determined essentially by a suitable selection of the starting components forming the polyurethane elastomers. Polyurethane elastomers based on polyester polyols are relatively susceptible to hydrolysis. This hydrolysis stability expresses itself in a constant decline in mechanical property values following long term exposure to water or steam. The hydrolysis stability of elastomers can be improved by using certain polyester polyols, such as 1,6-hexanediol-polyadapates. Polyurethane elastomers from 1,6-hexanediol-polyadapates indeed demonstrates sufficient hydrolysis resistance, however, a disadvantage is the high crystallization tendency of the 1,6-hexanediol-polyadapates, which is expressed by poor cold resistance from the polyurethane elastomers; the polyadapates also have a high melt point, which generally causes processing problems.

By using diol mixtures, for purposes of interfering in the crystallization, in preparing polyester polyols the cold behavior of the polyurethane elastomers can be improved, however, the hydrolysis stability of the polyurethane elastomers is in turn impaired.

The objectives of the present discovery were to develop polyester polyols having a viscosity as low as possible that are liquid at room temperature and which can be processed problem free with conventional equipment using the polyisocyanate addition polymerization process into non-cellular or cellular plastics having good mechanical property levels.

The polyester polyols, when used in preparing polyurethane elastomers, should provide products having a high hydrolysis resistance and at the same time offer improved cold resistance over the state of the art.

This objective was surprisingly met by the complete or partial use of 2-methyl-1,5-pentanediol, 2-ethyl-1,4-butanediol, 2-methyl glutaric acid and/or 2-ethylsuccinic acid as well as optionally other organic polycarboxylic acids and multivalent alcohols in the preparation of the polyester polyols.

SUMMARY OF THE INVENTION

The subject of the discovery is accordingly polyester polyols liquid at 25° C., which contain in bonded form units selected from the group having the structure:

—O—CH$_2$—CH(CH$_3$)—CH$_2$—CH$_2$—CH$_2$—O—,

—O—CH$_2$—CH(C$_2$H$_5$)—CH$_2$—CH$_2$—O—,

—OC—CH(CH$_3$)—CH$_2$—CH$_2$—CO—, and

—OC—CH(C$_2$H$_5$)—CH$_2$—CO— or which contain in bonded form structural mixtures of at least two of said structures.

In addition the subject of the invention is a process for the preparation of polyester polyols liquid at 25° C., which contain in bonded form units having at least one of these structures:

—O—CH$_2$—CH(CH$_3$)—CH$_2$—CH$_2$—CH$_2$—O—,

—O—CH$_2$—CH(C$_2$H$_5$)—CH$_2$—CH$_2$—O—,

—OC—CH(CH$_3$)—CH$_2$—CH$_2$—CO—

—OC—CH(C$_2$H$_5$)—CH$_2$—CO— and using said polyester polyols for the preparation of non-cellular or cellular polyurethane plastics or polyurethane polyurea plastics, preferably non-cellular or cellular polyurethane elastomers, using the polyisocyanates addition polymerization process.

DESCRIPTION OF PREFERRED EMBODIMENTS

The polyester polyols of the present invention have an average functionality from 2 to 3, more preferably from 2 to 2.5; a hydroxyl number from to 25 to 400, more preferably from 40 to 80 for elastics plastics, from 80 to 160 for semi-rigid plastics and from 160 to 400 for rigid plastics; an acid number smaller than 10 mg KOH/g, more preferably smaller than 2 mg KOH/g and most preferably from 0.9 to 0.2 mg KOH/g; and a viscosity at 25° C. from 200 to 10,000 and more preferably from 800 to 20,000 mPas. Non-cellular or cellular polyurethanes or polyurethane-polyurea plastics prepared from the said polyester polyols have a high mechanical property level for numerous technical applications and are particularly characterized by good hydrolysis stability, while simultaneously exhibiting improved cold strength and compatibility with inert physically effective blowing agents.

The polyester polyols of the present invention preferably contain in bonded form at least one unit having the structure:

—O—CH$_2$—CH(CH$_3$)—CH$_2$—CH$_2$—CH$_2$—O—
and

—O—CH$_2$—CH(C$_2$H$_5$)—CH$_2$—CH$_2$—O— and

—OC—CH(CH$_3$)—CH$_2$—CH$_2$—CO— and

—OC—CH(C$_2$H$_5$)—CH$_2$—CO— or units having the structures:

—O—CH$_2$—CH(CH$_3$)—CH$_2$—CH$_2$—CH$_2$—O—
and

O—CH$_2$CH(C$_2$H$_5$)—CH$_2$—CH$_2$—O— or

—OC—CH(CH$_3$)—CH$_2$—CH$_2$—CO— and

—OC—CH(C$_2$H$_5$)—CH$_2$—CO— as well as units having the structures:

—OC—CH(CH$_3$)—CH$_2$—CH$_2$—CO— and

—OCH$_2$—CH(CH$_3$)—CH$_2$—CH$_2$—CH$_2$—O— and

—O—CH$_2$—CH(C$_2$H$_5$)—CH$_2$—CH$_2$—O— or

—OC—CH(C$_2$H$_5$)—CH—CO— and

—O—CH$_2$—CH(CH$_3$)—CH$_2$—CH$_2$—CH$_2$—O—
and

—O—CH$_2$—CH(C$_2$H$_5$)—CH$_2$—CH$_2$—O— wherein said polyester polyols possess up to at least 10 weight percent, more preferably at least 30 weight percent, based on the total weight, of at least one of said structures. tures.

The polyester polyols of the present invention are prepared by reacting, in the presence of, or in the absence of catalysts: aliphatic and/or aromatic dicarboxylic acid dialkylesters having from 1 to 4 carbon atoms, more preferably from 1 to 2 carbon atoms in the alkyl radical, preferably dicarboxylic acid diethylester or most preferably dicarboxylic acid dimethylester with 2-methyl-pentanediol, 2-ethyl-butanediol, or mixtures of 2-methyl-pentanediol and 2-ethyl-butanediol, in a weight ratio from 1:99 to 99:1, more preferably 85:15 to 40:60, or mixtures of 2-methyl-1,5-pentanediol and/or 2-ethyl-1,4-butanediol and at least one linear or branched, optionally containing ether bridges, aliphatic di- through tetravalent alcohol having a content of 2-methyl-1,5-pentanediol and/or 2-ethyl-1,4-butanediol of a least 20 weight percent, more preferably from 40 to about 100 weight percent, based on the weight of the alcohol mixture; or from 2-methyl glutaric acid dialkylester, 2-ethyl succinic acid dialkylesters or mixtures of 2-methyl glutaric acid dialkylesters and 2-ethyl succinic acid dialkylesters having from 1 to 4 carbon atoms, more preferably from 1 to 2 carbon atoms in the alkyl radical, preferably 2-methyl glutaric acid diethylester and/or 2-ethyl succinic acid diethylester and most preferably 2-methyl glutaric acid dimethyl ester and/or 2-ethyl succinic dimethyl ester with 2-methyl-1,5-pentanediol, 2-ethyl-1,4-butanediol, linear or branched, optionally containing ether bridges, di-through tetravalent alcohols or mixtures of at least two of the multivalent aliphatic alcohols.

However, the polyester polyols of the present invention are preferably prepared by the polycondensation, in the presence of diluents, or particularly in the melt, as well as in the presence of or the absence of catalysts, of polycarboxylic acids and/or polycarboxylic acid derivatives as well as for example dicarboxylic acid monoalkylesters, dicarboxylic acid dialkylesters having from 1 to 4 carbon atoms, more preferably from 1 to 2 carbon atoms in the alkyl radical, such as dicarboxylic acid monomethylester and/or dicarboxylic acid dimethylester and/or mono and/or diethylester and hydrides from the group of 2-methyl glutaric acid; 2-ethyl succinic acid; aliphatic dicarboxylic acids having from 2 to 12 carbon atoms, more preferably from 4 to 6 carbon atoms; cycloaliphatic dicarboxylic acids having 6 to 20 carbon atoms, more preferably from 8 to 12 carbon atoms; aromatic dicarboxylic acids having from 8 to 20 carbon atoms, more preferably 8 carbon atoms; or mixtures of a least 2 of the said dicarboxylic acids and/or the dicarboxylic acids derivatives and multivalent aliphatic alcohols from the group: 2-methyl-1,5-pentanediol; 2-ethyl-1,4-butanediol; the linear or branched, optionally containing ether bridges, di- through tetravalent aliphatic alcohols, or mixtures of at least two of the multivalent alcohols, provided that the starting materials used contained at least one compound selected from the group: 2-methyl-1,5-pentanediol, 2-ethyl-1,4-butanediol, 2-methyl glutaric acid, 2-ethyl succinic acid or the corresponding dicarboxylic acid derivatives.

In addition to 2-methyl glutaric acidmonoalkyl ester, 2-methyl glutaric acid dialkylester, for example 2-methyl glutaric acid dimethylester; 2-ethyl succinic acid monoalkylester, 2-ethyl succinic dialkylester, such as 2-ethyl succinic dimethylester, individual examples of organic polycarboxylic acids and polycarboxylic acid derivatives are: aliphatic dicarboxylic acids such as dodecane dicarboxylic acids, undecane carboxylic acids, sebacic acid, azelaic acid, suberic acid, adipic acid, glutaric acid, succinic acid, phthalic acid, and oxylic acid, as well as the mono- and/or dimethyl-, -ethyl-,-n-propyl-, -isopropyl-, and -butylester, cycloaliphatic dicarboxylic acids such as hexahydrophthalic acid, hydride, diethylester, hexahydroterephthalic acids, dimethylester, and hexahydroisophthalic ester and aromatic dicarboxylic acids, such as phthalic acid, phthalic acid monomethylester, phthalic acid diethylester, phthalic acid anhydride, terephthalic acid, terephthalic acid monoethylester, terephthalic acid dimethyl and/or ethylester and isophthalic acids. The organic polycarboxylic acids and/or the polycarboxylic acid derivatives can be employed individually or as mixtures. Preferably used are phthalic acid, phthalic acid anhydride, phthalic acid mono methylester and phthalic acid dimethylester, mixtures of succinic, glutaric and adipic acid, in weight ratios of from 20 to 35:35 to 50:20 to 32 parts by weight and most preferably adipic acid.

As long as 2-methyl glutaric acid, 2-ethyl succinic acid and/or their derivatives are not exclusively used as polycarboxylic acids in the preparation of the polyester polyols of the present invention, then the mixtures of polycarboxylic acids and/or their derivatives comprise from 20 to about 100 weight percent, more preferably from 40 to about 100 weight percent of 2-methyl glutaric acid, 2-ethyl succinic acid and/or the corresponding dialkylesters, preferably dimethylesters, and from 80 to about 0 weight percent, more preferably from 60 to about 0 weight percent of aliphatic, cycloaliphatic and/or aromatic dicarboxylic acid and/or the corresponding dicarboxylic acid monoalkylester, dicarboxylic acid dialkylesters having from 1 to 4 carbon atoms in the alkyl radical or dicarboxylic acid anhydrides, preferably succinic acid, glutaric acid, adipic acid, phthalic acid or a mixture comprising at least two of said dicarboxylic acids, as well as the corresponding dicarboxylic monoalkylesters, dialkylesters and/or anhydrides, where the weight percents are based on the total weight of the mixture.

Along with the 2-methyl-1,5-pentanediol, 2-ethyl-1,4-butanediol or mixtures of 2-methyl-1,5-pentanediol, 2-ethyl-1,4-butanediol in a weight ratio from 1:99 to 99:1, preferably 85:15 to 40:16, the following are used as aliphatic di-through tetravalent, more preferably trivalent and most preferably divalent alcohols:

Branched and/or preferably linear alkanediols having from 2 to 12 carbon atoms, more preferably 2 to 6 carbon atoms in the alkylene radical; polyoxyalkylenediols, preferably those based on 1,2-propylene oxide and/or ethylene oxide, having a molecular weight from 106 to 622, more preferably 106 to 262; linear or branched alkanetriols having from 3 to 6 carbon atoms and/or pentaerythritol. Examples of alkanediols include 2,2-dimethyl-1,3-propanediols, 2,2,4-trimethyl-1,6-hexanediol, 1,3-butanediol, ethanediol, 1,2 and 1,3-propanediol, 1,4-butanediol, 1,5-pentanediol, 1,6-hexanediol, 1,8-octanediol, 1,10-decanediol, and 1,12-dodecanediol; polyoxyalkylenediols such as diethylene glycol, trioxyethylene glycol, tetraoxyethylene glycol and higher molecular polyoxyethylene glycols, dipropylene glycols, trioxypropylene glycols, tetraoxypropylene glycols and higher molecular polyoxypropylene glycols, as well as polyoxypropylene polyoxyethylene glycols; and alkanetriols including trimethylolethane, trimethylolpropane and glycerine. The multivalent aliphatic, optionally containing ether bridges, alcohols are used individually or as mixtures. Preferably used are: Ethanediol, 1,2 and/or 1,3-propanediol, 1,4-butanediol, 1,5-pentanediol, 1,6-hexanediol, diethylene glycol, dipropylene glycol, glycerine, trimethylolpropane or a mixture comprising at least two of these multivalent aliphatic alcohols.

As long as 2-methyl 1,5-pentanediol and/or 2-ethyl 1,4-butanediol are not exclusively used as the multivalent alcohol in the preparation of the polyester polyols of the present invention, then the alcohol mixtures comprise from 20 to about 100 weight percent, more preferably from 40 to 80 weight percent of 2-methyl 1,5-pentanediol and/or 2-ethyl 1,4-butanediol and from 80 to about 0 weight percent, more preferably from 20 to 60 weight percent of at least one linear or branched alkanediol having from 2 to 12 carbon atoms; a polyoxyalkylenediol having a molecular weight of 106 to 622; a linear or branched alkanetriol having from 3 to 6 carbon atoms and/or pentaerythritol; preferably ethanediol, 1,2 and/or 1,3-propanediol, 1,4-butanediol, 1,5-pentanediol, 1,6-hexanediol, diethylene glycol, dipropylene glycol, glycerine, trimethylolpropane or a mixture of at least two of these multivalent aliphatic alcohols, whereby the weight percents are based on the entire weight of the alcohol mixture.

As already stated, the organic polycarboxylic acids and/or their derivatives and multivalent alcohols can be polycondensed catalyst free or in the presence of esterification or transesterification catalysts. Examples of esterification catalysts are: cadmium, cobalt, lead, zinc, antimony, magnesium, titanium, and tin catalysts in the form of metals, metal oxides or metal salts. Preferably used are tin salts, such as those according to U.S. Pat. No. 3,162,616, tin dioctoate and/or tetrabutyl orthotitanate. Examples of transesterification catalysts are: zinc acetate, antimony acetate and tetrabutyl orthotitanate.

In the preparation of the polyester polyols of the present invention, the organic polycarboxylic acid dialkylesters, preferably the 2-methyl glutaric acid dimethylester and/or 2-ethyl succinic acid dimethylester, optionally mixed with aliphatic, cycloaliphatic and/or aromatic dicarboxylic acid alkylesters and aliphatic multivalent alcohols or mixtures of 2-methyl 1,5-pentanediol and/or 2-ethyl 1,4-butanediol and aliphatic multivalent alcohols or aliphatic, cycloaliphatic and/or aromatic dicarboxylic acid alkylester and 2-methyl 1,5-pentanediol and/or 2-ethyl 1,4-butanediol in a mole ratio of from 1:1.04 to 1:2.5, more preferably 1:1.05 to 1.5, are transesterified without a diluent or in the presence of a diluent as well as catalyst-free or preferably while using transesterification catalysts at temperatures from 150° to 250° C., more preferably from 180° to 220° C. After completing the transesterification, where normally reaction times from 8 to 20 hours are required, the excess alcohols and optionally diluent are preferably distilled off under reduced pressure.

As previously stated, the polyester polyols of the present invention are preferably prepared by polycondensation under azeotropic conditions or most preferably in the melt, catalyst free or preferably while using transesterification catalysts, in an atmosphere of an inert gas such as nitrogen, carbon monoxide, helium, argon, and the like, at temperatures from 80° to 250° C., preferably from 150° to 220° C. and more preferably from 180° to 220° C., optionally under reduced pressure until the desired acid number is obtained preferably smaller than 2.

Examples of diluents and/or water entraining agents are benzene, toluene, xylene, chlorobenzene, dichlorobenzene, etc. The organic polycarboxylic acids and/or derivatives and multivalent alcohols are used in such quantities so that the ratio of carboxyl groups and/or equivalent reactive carboxylic acid radicals to the hydroxyl groups is from 1:1 to 2.5, more preferably 1: 1.05 to 1.8. Following one of the preferred embodiments, the esterification mixture is polycondensed within the previously stated temperature range, up to an acid number from 80 to 20, more preferably from 40 to 30, under normal pressure and subsequently under a reduced pressure of smaller than 500 mbar, more preferably from 50 to 150 mbar. Conventional polycondensation times here are from 10 to 30 hours, more preferably from 15 to 20 hours.

The polyester polyols of the present invention are used as previously stated in the preparation of non-cellular or cellular polyurethane plastics or polyurethane polyurea plastics, abbreviated PU and/or PU-PH plastics, preferably in the preparation of non-cellular or cellular PU or PU-PH elastomers using the polyisocyanate addition polymerization process.

In preparing the polyurethane plastics or polyurethane polyurea plastics and/or elastomers the following are reacted together using conventional technical processes:
  a. organic polyisocyanates with;
  b. the polyester polyols of the present invention, and;
  c. chain extending agents and/or cross-linking agents in the presence of;
  d. catalysts; and optionally
  e. blowing agents;
  f. additives and/or auxiliaries.

The following can be noted regarding starting components (a), (c), (d) and optionally (e) and (f).

Typical organic polyisocyanate (a) include aliphatic, cycloaliphatic, araliphatic and preferably aromatic isocyanates. Individual examples are: alkylene diisocyanates having from 4 to 12 carbon atoms in the alkylene radical, such as 1, 12-dodecane-diisocyanate, tetramethylene 1,4-diisocyanate and preferably hexamethylene-1,6-diisocyanate; cycloaliphatic diisocyanates, such as cyclohexane-1,3-diisocyanate and cyclohexane-1,4-diisocyanate as well as optional mixtures of the isomers 1-isocyanato-3,3,5-trimethyl-5-isocyanatomethyl-cyclohexane (isophoron-diisocyanate) 2,4- and 2,6-hexahydrotoluylene diisocyanate as well as the corresponding isomeric mixtures, 4,4'-,2,2,- and 2,4'-dicyclohexylmethane diisocyanate as well as the corresponding isomeric mixtures; and preferably aromatic di and polyisocyanates such as 4,4,-, 2,4'- and 2,2'diisocyanato diphenylmethane and the corresponding isomeric mixtures 2,4- and 2,6-diisocyanato toluene and the corresponding isomeric mixtures polyphenyl-polymethylene-polyisocyanates and preferably mixtures of diphenylmethane-diisocyanates and polyphenyl-polymethylene-polyisocyanates (Crude MDI). The said di- and polyisocyanates can be used individually or in the form of mixtures.

Frequently, so called modified multivalent isocyanates are used such as products obtained by chemically reacting the above di- and/or polyisocyanates. Typical examples of modified organic di- and polyisocyanates are: carbodiimide group containing polyisocyanates according to DE No. 10 92 007; Allophanate group containing polyisocyanates, such as e.g. in British Patent No. 994,890 and in the Belgian Patent No. 761,626 and in the Netherlands OS No. 7,102,524; isocyanurate group containing polyisocyanates such as those disclosed in DE No. 10 22 789; 12 22 067; and 10 27 394 as well as in DEOS No. 19 29 034 and 20 04 048; urethane group containing polyisocyanates such as disclosed in Belgian Patent No. 752,261 or U.S. Pat. No. 3,394,164; acylated urea group containing polyisocyanates such as according to DE No. 12 30 778; biuret group containing polyisocyanates such as disclosed in DE No. 11 01 394 and Great Britain No. 889 050; polyisocyanates prepared by telomerization reactions such as as disclosed in Belgian Patent No. 723,640; ester group containing polyisocyanates such as disclosed in Great Britian Patent Nos. 965,474 and 1,072,956 and U.S. Pat. No. 3,567,765 and in DE No. 12 31 688.

However, preferably used are: urethane group containing polyisocyanates, for example having lower molecular weight linear or branched alkanediols, dialkylene glycols or polyoxyalkylene glycols having molecular weights up to 3,000 based on ethylene oxide, 1,2-propylene oxide or their mixtures, modified 4,4'- and/or 2,4'-diphenylmethane-diisocyanate or 2,4- and/or 2,6 tolulene-diisocyanate, carbondiimide group and/or isocyanurate ringe containing polyisocyanates, such as those based on 4,4'-, 2,4'-diphenylmethane diisocyanate, 2,4- and/or 2,6-tolulene diisocyanate and most preferably 4,4'-diphenylmethane diisocyanate; mixtures of 2,4'- and 4,4'-diphenylmethane diisocyanate, tolulene diisocyanates, mixtures of diphenylmethane diisocyanates and polyphenyl polymethylene polyisocyanates (Crude-MDI) and mixtures of tolulene diisocyanates and Crude-MDI. Used as chain extending agents and/or crosslinking agents (c) are at least di-functional organic compounds from the group:

(ci) primary aromatic diamines, whose primary amino groups in relation to the polyisocyanates are sterically hindered by at least one ortho postioned alkyl substituent to each amino group;

(cii) secondary aromatic diamines; and preferably (ciii) multivalent, preferably divalent alcohols and/or polyoxyalkylene polyols having molecular weights smaller than 5,000, more preferably from 62 to 300.

Preferably used as sterically hindered primary aromatic diamines (ci) are alkyl substituted meta-phenylene diamines having the structural formulas

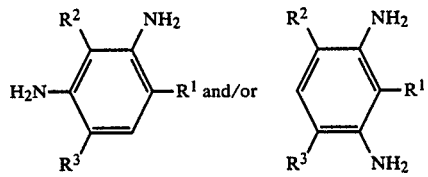

where $R^1$ is a hydrogen atom or linear or branched alkyl radical having from 1 to 12 carbon atoms, more preferably from 1 to 6 carbon atoms; and $R^2$ and $R^3$ are the same or different, linear or branched alkyl radicals having from 1 to 4 carbon atoms, such as methyl, ethyl, n-propyl, isopropyl, butyl or sec. butyl.

Preferred are those alkyl radicals $R^1$ in which the branched position is on the first carbon atom. In addition to hydrogen, the followings radicals are all examples of the alykyl radical $R^1$: methyl, ethyl, n- and isopropyl, butyl, hexyl, octyl, decyl, 1-methyl-octyl, 2-ethyl-octyl, 1-methyl-hexyl, 1,1-dimethyl-pentyl, 1,3,3-trimethyl-hexyl, 1-ethyl-pentyl, 2-ethyl-pentyl and preferably cyclohexyl-, 1-methyl-n-propyl, tert.-butyl, 1-ethyl-n-propyl, 1-methyl-n-butyl and 1,1-dimethyl-n-propyl.

Examples of alkyl substituted meta-phenylene diamines are: 2,4-dimethyl, 2,4-diethyl, 2,4-diisopropyl, 2,4-diethyl-6-methyl, 2-methyl-4,6-diethyl, 2,4,6-triethyl, 2,4-dimethyl-6-cyclohexyl, 2-cyclohexyl-4,6-diethyl, 2-cyclohexyl-2,6-diisopropyl, 2,4-dimethyl-6-(1-ethyl-n-propyl), 2,4-dimethyl-6-(1,1-dimethyl-n-propyl) and 2-(1-methyl-n-butyl)-4,6-dimethyl-1,3-phenylenediamine.

Other suitable alkyl substituted diamino-diphenylmethanes include 3,3'-di- and 3,3',5,5'-tetra-n-alkyl substituted 4,4'-diamino-diphenylmethanes such as 3,3'-diethyl, 3,3',5,5'-tetraethyl- and 3,3',5,5'-tetra-n-propyl-4,4'-diamino-diphenylmethane.

Advantageously used are diamino-diphenylmethanes having the structural formula:

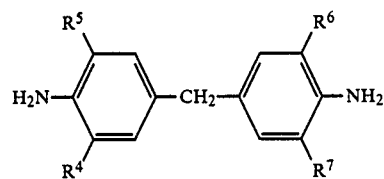

in which $R^4$, $R^5$ $R^6$ and $R^7$ are the same or different methyl, ethyl, propyl, isopropyl, sec. butyl and t-butyl radical, provided however at least one of radicals must be a isopropyl or sec butyl. The alkyl substituted 4,4'-diamino-diphenylmethanes can also be employed mixed with isomers having the following structural formula:

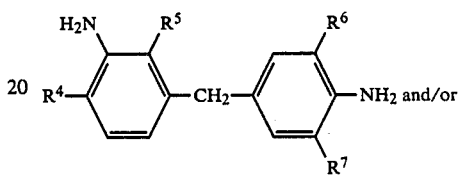

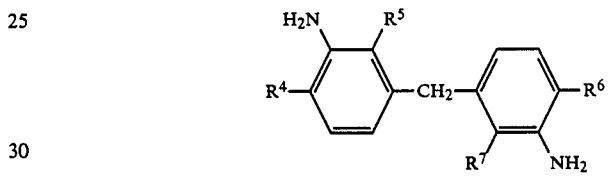

where $R^4$, $R^5$, $R^6$ and $R^7$ have the above stated meaning.

Individual examples are: 3,3',5-trimethyl-5'-isopropyl, 3,3', 5-trimethyl-5'-sec-butyl, 3,3', 5-triethyl-5'-sec-butyl-4,4'-diamino-diphenylmethane; 3,3'-dimethyl-5,5'-diisopropyl, 3,3'-diethyl-5,5'-diisopropyl, 3,3'-dimethyl-5,5'-di-sec-butyl, 3,3'-diethyl-5,5'-di-sec-butyl, 3,5-dimethyl-3',5'-diisopropyl, 3,5-diethyl-3',5'-diisopropyl, 3,5-dimethyl-3',5'-di-sec-butyl, 3,5-diethyl-3',5'-di-sec.-butyl-4,4'-diamino-diphenylmethane; 3-methyl-3',5,5'-triisopropyl, 3-ethyl-3',5,5'-triisopropyl, 3-methyl-3',5,5'-tri-sec-butyl, 3-ethyl-3', 5,5'-tri-sec-butyl-4,4'-diamino-diphenylmethane, 3,3'-diisopropyl-5,5'-di-sec-butyl, 3,5-diisopropyl-3',5'-di-sec-butyl, 3-ethyl-5-sec-butyl-3',5'-diisopropyl, 3-methyl-5-tert.-butyl-3',5'-diisopropyl, 3-ethyl-5-sec-butyl-3'-methyl-5'-tert-butyl, 3,3', 5,5'-tetra-sec-butyl 4,4'-diamino-diphenylmethane.

The following primary aromatic diamines are preferably used: 2,4-diethyl and 2,4-dimethyl-phenylene 1,3,-diamine; 2,4-diethyl-6-methyl-2-methyl-4,6-diethylphenylene 1,3,-diamine; 2,4,6-triethyl-phenylene 1,3-diamine; 2,4-dimethyl-6-tert-butyl, 2,4-dimethyl-6-isoctyl- and 2,4-dimethyl-6-cyclohexyl-phenylene 1,3-diamine; as well as 3,5-dimethyl-3',5'-diisopropyl- and 3,3', 5,5'-tetraisopropyl-4,4'-diamino-diphenylmethane.

The primary aromatic diamines (ci) can be used individually or in the form of mixtures, for example alkyl substituted 1,3-phenylenediamines, 3,3'-di- and/or 3,3', 5,5'-tetraalkyl substituted 4,4'-diamino-di-phenylmethanes.

Typical examples of secondary aromatic diamines (cii) are: N,N'-dialkyl substituted aromatic diamines, which optionally can be substituted on the aromatic ring by alkyl radicals, having from 1 to 20, more preferably from 1 to 4 carbon atoms in the N-alkyl radical such as N,N'-diethyl, N,N'-di-sec-pentyl, N,N'-sec-hexyl, N,N'-di-sec-decyl, N,N'-dicyclohexyl-p- and/or -m-phenylenediamine; N,N'-dimethyl, N,N'-diethyl, N,N'-diisopropyl, N,N'-di-sec.-butyl, N,N'-dicyclohexyl-4,4'-diamino-diphenylmethane; and N,N'-di-sec-butyl-benzidine.

Examples of multivalent alcohols and/or polyoxyalkylene polyols (ciii) are: aliphatic and/or araliphatic diols having from 2 to 14, preferably 2 to 6 carbon atoms such as 1,3,-propanediol, 1,10-decandeiol, diethyleneglycol, dipropyleneglycol, Bis-(2-hydroxyethyl)-hydroquinone and more preferably ethylene glycol, 1,4-butanediol and 1,6-hexanediol; triols such as glycerine and trimethylolpropane; and lower molecular polyoxyalkylene polyols based on ethylene oxide and/or 1,2-propylene oxide and the previsouly stated initiator molecules.

The chain extending agents and/or cross-linkers (c) can be used individually or in the form of mixtures and are used, for example, in quantities from 5 to 50 parts by weight, more preferably from 10 to 40 parts by weight and most preferably from 15 to 30 parts by weight based on 100 parts by weight of the polyester polyols (b). In as much as mixtures of sterically hindered primary aromatic diamines (ci) and secondary aromatic diamines (cii) and/or multivalent alcohols (ciii) are used, these mixtures contain from 1 to 40, more preferably from 5 to 20 parts by weight of components (cii) and/or (ciii) per 100 parts by weight of the (ci) components. Lower molecular weight diols (ciii) and/or aromatic diamines (ci) are most preferably used as chain extending agents, which contain in bonded form in the ortho postion relative to each amino group at least one alkyl radical.

Compounds useful used as catalysts (d) are those which strongly accelerate the reaction of the polyester polyols (b) and the compounds of components (ciii) optionally containing hydroxyl groups with the polyisocyanates. Organic metal compounds are used, preferably organic tin compounds such as tin (II) salts of organic carboxylic acids, for example, tin (II) acetate, tin (II) octoate, tin (II) ethyl hexoate, and tin (II) laurate, and the dialkyl tin (IV) salts of organic carboxylic acids, for example dibutyl tin diacetate, dibutyl tin dilaurate, dibutyl tin maleate, and dioctyl tin diacetate. The organic metal compounds can be used alone or preferably in combination with strongly basic amines. Examples of amines are: 2,3-dimethyl-3,4,5,6-tetrahydropyrimidine, tertiary amines, such as triethyl amine, tributylamine dimethylbenzyl-amine, N-methyl-, N-ethyl-, N-cyclohexylmorpholine, N,N,N,N'-tetramethylethylenediamine, N,N,N',N'-tetramethylbutanediamine, pentamethyl-diethylenetriamine, tetramethyl-diamino-ethyl-ether, bis-(dimethylaminopropyl) urea, dimethylpiperazine, 1,2-dimethylimidazole, 1-azabicicylo-(3,3,0)-octane and preferably 1,4-diaza-bicyclo-(2,2,2)-octane; and alkanol compounds, such as triethanolamine, triisopropanolamine, N-methyl and N-ethyl-diethanolamine and dimethylethanolamine.

Other useful catalysts include: tris-(dialkylaminoalkyl)-3-hexahydrotriazines, especially tris-(N,N-dimethylaminopropyl)-s-hexanhydrotriazine; tetraalkyl ammonium hydroxides, such as tetramethyl ammonium hydroxide, alkali hydroxides, such as sodium hydroxide; and alkali alcoholates, such as sodium methylate and potassium isopropylate such as alkali salts of long chained fatty acids having from 10 to 20 carbon atoms and optionally lateral OH groups. Preferably used is from 0.001 to 5 weight percent, particularly from 0.05 to 2 weight percent of catalyst and/or a catalyst combination based on the weight of the (b) component. nent.

Among the blowing agents (e) which can be used for the preparation of cellular plastics and molded articles is water which reacts with isocyanate groups to form carbon dioxide. The amount of water which can be used is from 0.1 to 2 weight percent, more preferably from 0.5 to 1.5 weight percent, based on the weight of the (b) component.

Other blowing agents used are low boiling point liquids which evaporate as a result of the exothermic addition polymerization reaction. Suitable are liquids which are inert to the organic polyisocyanate and which have boiling points under 100° C. Examples of such preferably used liquids are halogenated hydrocarbons such as methylene chloride, trichlorofluoromethane, dichlorodifluoromethane, dichloromonofluoromethane, dichlorotetrafluorethane and 1,1,12-trichloro-1,2,2-trifluoroethane.

Mixtures of these low boiling point liquids can be used with one another and/or with other substituted or unsubstituted hydrocarbons.

The most desired amount of low boiling point liquid to be used in preparing the cellular PU or PU-PH molded articles depends on the desired density as well as optionally on the co-use of water. In general, amounts from 0.5 to 15 parts by weight, based on 100 parts by weight of the (b) components, provide satisfactory results.

Auxiliaries and/or additives (f) can also be incorporated into the reaction mixture. Typical examples are surfactants, internal mold release agents, foam stabilizers, cell regulators, fillers, colorants, pigments, flame retardants, antihydrolysis agents, fungistats and bacteriostatic agents.

Surfactants which may be used are those which assist in the homogenation of the starting components and which optionally also regulate the cell structure. Typical examples are emulsifiers such as the sodium salts of castor oil sulfates or of fatty acids as well as salts of fatty acids, with amines, for example oleic acid diethylamine or stearic acid diethanol amine; salts of sulfonic acids, such as alkli- or ammonium salts of dodecylbenzene- or di-naphthylene methane; disulfonic acids; and ricinoleic acids; foam stabilizers, such as siloxane oxyalkylene mixed polymers and other organopolysiloxanes; oxyethylated alkylphenols, oxyethylated fatty alcohols, paraffin oils, castor oil and/or castor oil ester and Turkey red oil and cell regulators such as paraffin, fatty alcohols and dimethylpolysiloxanes. The surfactants are commonly employed in quantities from 0.01 to 5 parts by weight based on 100 parts by weight of the (b) component.

Suitable internal mold release agents are, for example, carboxylic esters and/or carboxylic amides which are prepared through the esterification or amination of a mixture comprising montanic acid and at least one aliphatic carboxylic acid having at least 10 carbon atoms with at least difunctional alkanolamines, polyols and/or polyamines having molecular wieghts of from 60 to 400.

Fillers, in particular reinforcing fillers, are understood to be the essentially known organic and inorganic fillers, reinforcing substances, weight-increasing substances, substances for improving the wear resistance in paints, coatings, etc. Typical examples of inorganic fillers are: silicate minerals, for example laminar silicates such as antigorite, serpentine, horn blends, amphibole, chrisotile, talcum; metal oxides such as kaolin, aluminum oxides, titanium oxides and iron oxides, metal salts such as chalk, heavy spar and inorganic pigments, such as cadmium sulfide, zinc sulfide, as well as glass, powdered asbestos and others. Preferably used are: kaolin (China clay), aluminum silicate, and co-precipitates of barium sulfate and aluminum silicate, as well as natural and synthetic fibrous minerals, such as asbestos and Wollastonite, and especially glass fibers of different lengths which optionally can be sized. Typical organic fillers are: coal, melamine, pine resin, cyclopentadiene resins and graft polymers based on styrene-acrylonitrile, which are prepared through in-situ polymerization of acryloitrilestyrene-mixtures in polyetherols as described in German Patent Nos. 11 11 394, 12 22 669 (U.S. Pat. Nos. 3,304,273; 3,383,351; 3,523,093); 1,152,536 (GB No. 1 040 452) and 1,152,537 (GB No. 987 618), as well as filler-polyoxyalkylene polyols, in which aqueous polymer dispersions are converted to polyoxyalkylene-polyol dispersions.

The inorganic and organic fillers are incorporated into the reaction mixture preferably in amounts of from 0.5 to 50 weight percent, preferably 1 to 40 weight percent, based on the weight of the components (a) through (c).

Suitable flame retardants are, for example, tricresylphosphate, tris-2-chloroethyl phosphate, trischloropropyl phosphate, and tris-2,3 dibromopropyl phosphate.

In addition to the already mentioned halogen-substituted phosphates, inorganic flame retardants can also be used for flameproofing the plastics and/or molded articles like aluminum hydroxide, antimony troxide, ammonium polyphosphate, and calcium sulfate. It has generally proven to be useful to use from 5 to 50 parts by weight, preferably from 5 to 25 parts by weight, of the said flame retardant for each 100 parts by weight of the (b) component.

Further information concerning the above mentioned other common auxiliary agents and additives can be obtained from the technical literature; for example, from the monograph of J. H. Saunders and K. C. Frisch, *High Polymers*, Parts 1 and 2, Interscience Publishers 1962 and 1964, respectively.

In preparing the optional cellular PU or PU-PH molded articles, the organic polyisocyanates (a), polyester polyols (b) and chain extending agents and/or crosslinkers (c) are reacted in such amount so that the equivalent ratio of NCO groups of the polyisocyanate (a) to the total of the reactive hydrogen atoms of components (b) and (c) is from 1:0.85 to 1.25, preferably 1:0.95 to 1.15.

The non-cellular and preferably cellular molded articles are prepared using the prepolymer process or preferably using the one shot process, where PU molded articles are efficaciously prepared with the help of either low pressure technology or by a casting process and PU-PH molded articles are prepared with the help of reaction injection molding technology.

These types of processes are desribed, for example, by Piechota and Rohr *Integral Skin Foams*, Carl-Hanser, publishers, Munich, Vienna 1975; D. J. Prepelka and J. L. Wharton in *Journal of Cellular Plastics*, March/April, 1975, pp. 87 through 98; and U. Knipp in *Journal of Cellular Plastics*, March/April 1973, pp. 76 through 84.

When using a mixing chamber with several feed nozzles, the starting components may be fed in individually and mixed intensively in the mixing chamber. It has been found to be particularly advantageous to work according to the two component process, and to dissolve the chain extending agents and/or crosslinkers (c) and catalysts (d) in the polyester polyols (b) and optionally with blowing agents (e); to incorporate auxiliary and/or additives (f) into the so-called A-side components and to use organic, optionally modified, polyisocyanates as the so-called B-side components. An advantage in this instance is, for example, that the (A side) and (B side) components can be stored separately and transported in a space-saving manner, and that only the desired amounts need be mixed together during processing.

In preparing the molded articles, the amount of reaction mixture injected into the mold is measured, so that the resulting non-cellular molded articles have a density of from 1.0 to 1.4 g/cm$^3$, preferably from 1.0 to 1.2 g/cm$^3$; and the cellular molded articles have a density of from 1.2 to 1.1 g/cm$^3$; the microcellular molded articles preferably have a density of about from 0.8 to 1.0 g/cm$^3$; shoe soles preferably having a density of 0.4 to 0.65 g/cm$^3$; and cellular plastics preferably having a density of from 0.25 to 0.4 g/cm$^3$. The initial components are injected into the mold at a temperature of from 15°–80° C., preferably from 20° to 60° C., and more preferably from 25° to 55° C. The mold temperature is from 20° to 100° C., preferably from 30° to 80° C. The degree of compression in preparing the microcellular or cellular mold articles is between 1.1 and 8, preferably between 2 and 8.

The non-cellular of cellular PU-PH molded articles obtained through the process of this invention are particularly useful in the automobile industry, for example as bumper coverings, impact protection moldings, body parts, such as drip moldings, fenders, spoilers and wheel extensions, as well as engineerng housing components and rollers and shoe soles. The cellular foams are used for example as arm rests, head rests, safety coverings in the interior of the automobiles, as well as motorcycle and bicycle seats and for coverings in composite foams.

The parts cited in the following examples refer to parts by weight.

Examples 1–9 and Comparative Examples A–E

Preparation of Polyester Polyols by the polycondensation of polycarboxylic acids and diols General Preparation Protocol The aliphatic dicarboxylic acids and apliphatic diols cited in Table I were mixed together in the stated quantities at room temperature while stirring under normal pressure; and while distilling off the water of condensation were esterified at temperatures up to 220° C. under an atmosphere of nitrogen until an acid number of about 20 was achieved. Subsequently, the polycondensation was continued to its completion under a reduced pressure of about 50 mbar; as well as optionally distilling off the excess diol.

The polyester polyols obtained had the characteristic data cited in Table I.

TABLE I

| Starting Components | | Examples 1 | 2 | 3 | 4 | 5 | 6 | Comparative Examples A | B | Examples 7 | 8 | 9 | Comparative Examples C | D | E |
|---|---|---|---|---|---|---|---|---|---|---|---|---|---|---|---|
| Adipic Acid | pbw | 59.9 | 60.2 | 75.5 | 67.1 | 65.5 | 60.2 | 73.5 | 69.3 | — | — | — | — | 32.88 | — |
| 2-Methyl glutaric acid | pbw | — | — | — | — | — | — | — | — | 34.30 | 19.8 | 28.01 | — | — | — |
| 2-Ethyl succinic acid | pbw | — | — | — | — | — | — | — | — | — | 4.95 | 4.95 | — | — | — |
| Dicarboxylic acid mixture[1] | pbw | — | — | — | — | — | — | — | — | — | — | — | 22.69 | — | 58.21 |
| 2-Methyl-1,5-pentanediol | pbw | 46.6 | 54.6 | — | — | — | — | — | — | — | — | — | — | — | — |
| 2-Ethyl-1,4-butanediol | pbw | 8.2 | — | 22.3 | 30.1 | 13.7 | 54.6 | — | — | — | — | — | — | — | — |
| 1,2-Ethanediol | pbw | — | — | 23.4 | — | — | — | 11.4 | — | 13.30 | 11.18 | 14.98 | 11.5 | 15.20 | 30.74 |
| 1,4-Butanediol | pbw | — | — | — | 22.9 | 26.9 | — | 33.2 | 47.4 | — | — | — | — | — | — |
| Triisopropanolamine | pbw | — | — | — | — | — | — | — | — | — | 12.5 | — | — | — | 29.2 |
| Characteristic Data | | | | | | | | | | | | | | | |
| Hydroxyl number [mg KOH/g] | | 57.1 | 57.6 | 56.4 | 55.6 | 58.8 | 56.7 | 56.5 | 58.7 | 40.2 | 300 | 61.2 | 61.7 | 60.1 | 300 |
| Acid number [mg KOH/g] | | 0.9 | 0.7 | 0.7 | 0.7 | 0.7 | 0.7 | 0.5 | 0.6 | 0.2 | 1.1 | 0.2 | 0.5 | 0.7 | 1.2 |
| Viscosity at 25° C. [m pas] | | 7300 | 7400 | 9050 | 8500 | 8000 | 6700 | — | — | 10300 | 2850 | 7890 | 21330 | — | 3900 |
| Iodine Color Number | | 1 | 1 | 1–2 | 1–2 | 1 | 1 | 2 | 2–3 | 3–4 | 3–4 | 3–4 | 80 | 1–2 | 80 |
| State of Aggregation at 25° C. | | liq. | liq. | liq. | liq. | liq. | liq. | sol. | sol. | liq. | liq. | liq. | liq. | sol. | liq. |

[1] The dicarboxylic acid mixture cited here in Table I contained 25 parts by weight of succinic acid, 50 parts by weight of glutaric acid, and 25 parts by weight adipic acid.

EXAMPLES 10–12
Preparation of Polyester Polyols by Transesterification

The aliphatic dicarboxylic acid dimethylesters and aliphatic diols listed in Table II were mixed together in the stated quantities at room temperature while stirring, under normal pressure and then transesterfied, while distilling off the methanol, at 190° C. under a stream of nitrogen. Subsquently, the polycondensation was carried out until completion under a reduced pressure of about 50 mbar and the excess diol was distilled off.

The polyester polyols obtained had the characteristic data cited in Table II.

TABLE II

| | | Examples 10 | 11 | 12 |
|---|---|---|---|---|
| Starting Components | | | | |
| 2-Methyl-glutaric acid dimethyl ester | parts by weight | 26.41 | 29.04 | 18.47 |
| 2-Ethyl-succinic acid dimethyl ester | parts by weight | 4.66 | 5.12 | 3.26 |
| 1,2-Ethanediol | parts by weight | 12.12 | 14.83 | 8.49 |
| Triisopropanolamine | parts by weight | — | — | 9.22 |
| Characteristic Data | | | | |
| Hydroxyl Number [mg KOH/g] | | 62.8 | 122.4 | 302 |
| Acid Number [mg KOH/g] | | 0.4 | 0.1 | 0.8 |
| Viscosity at 25° C. (m Pas) | | 7150 | 1102 | 2605 |
| Iodine Color Number | | 3–4 | 3–4 | 3–4 |

Determination of the hydrolysis resistence of the polyester polyols

The polyester polyols were mixed with 2 weight percent of water and stored at 65° C. The increase in the acid number following the storage time represented a measure of the hydrolysis resistence of the polyester polyols.

| Polyester-Polyols Prepared according to Example/Comparative Example | Acid Number [mg KOH/g] | Acid Number after 100 days [mg KOH/g] |
|---|---|---|
| 7 | 0.2 | 0.2 |
| 10 | 0.4 | 0.4 |
| C | 0.5 | 5.4 |
| D | 0.7 | 1.5 |

EXAMPLES 13–18 and COMPARATIVE EXAMPLE F

A polyurethane formulation for the preparation of cellular polyurethane elastomers for shoe soles A-Side Component: a mixture comprising:

| | |
|---|---|
| 82.83 | parts by weight of a polyester polyol prepared according to examples 1 through 6 or according to comparative example A, |
| 8.95 | parts by weight of ethylene glycol, |
| 1.0 | parts by weight of a 33 weight percent solution of triethylene diamine in ethylene glycol |
| 3.9 | parts by weight of an antistatic agent |
| 0.16 | parts by weight of silicone oil (DC 193 from the Dow Corning Company) |
| 1.5 | parts by weight of color paste |
| 1.8 | parts by weight of 1,1,2-trichloro-2,2 1-trifluoroethane and |
| 0.28 | parts by weight of water. |

B-Side Component:

An NCO group containing prepolymer having an NCO content of 18.7 weight percent, prepared by reacting 65 parts by weight of a 1,4-butanediol-ethylene glycol-poly-adipate (OH-number equals 56) with 100 parts by weight of 4,4'-diphenylmethane diisocyanate.

100 parts by weight of the A-side components and 93 parts by weight of B-side components (corresponding to NCO index of 100) were mixed together at 40° C. using a low pressure proportioning machine of the type F20 from the Elastogram Machinenbau GmbH in Strasslach.

250g of the reaction mixture obtained was placed into a metal mold heated to a temperature to 45° C. having the dimensions of 200×200×10 mm, and it was allowed to cure in the closed mold. The mold time was 10 seconds.

The polyester polyols used and the mechanical properties measured on the mold articles obtained are all summarized in Table III.

TABLE III

|  | Examples | | | | | | Comparative Example |
|---|---|---|---|---|---|---|---|
|  | 13 | 14 | 15 | 16 | 17 | 18 | F |
| Polyester-polyol according to example: | 1 | 2 | 3 | 4 | 5 | 6 | — |
| Polyester-polyol according to Comparative Example: | — | — | — | — | — | — | A |
| Mechanical Properties: | | | | | | | |
| Density [g/cm$^3$] | 0.6 | 0.6 | 0.6 | 0.6 | 0.6 | 0.6 | 0.6 |
| Shore A-Hardness according DIN 53 505 | 65 | 65 | 68 | 77 | 68 | 71 | 75 |
| Tensile strength according DIN 53 504 [N/mm$^2$] | 7.9 | 10.2 | 9.3 | 9.5 | 10.3 | 9.4 | 8.2 |
| Percentage Elongation at Break according DIN 53 504 [%] | 430 | 440 | 425 | 411 | 454 | 403 | 380 |
| Tear progagation strength according to DIN 53515 [N/mm] | 13.7 | 12.3 | 9.5 | 12.7 | 11.3 | 10.7 | 8.8 |
| Repeated flexural stress behavior following 30,000 load cycles | | | | | | | |
| Before the hydrolysis aging | ok | ok | ok | ok | ok | ok | ok |
| After the hydrolysis aging (7 days at 70° C. 100% relative humidity) | ok | ok | ok | ok | ok | ok | break |

EXAMPLE 19

A polyurethane formulation for the preparation of a cellular polyurethane elastomer A-side Component, a mixture comprising:

| 83.0 | parts by weight of polyester polyol prepared according to Example 10. |
| 9.0 | parts by weight of ethylene glycol. |
| 1.0 | parts by weight of a 33 weight percent solution of triethylene diamine in ethylene glycol. |
| 3.7 | parts by weight of antistatic agent. |
| 0.2 | parts by weight of silicone oil (DC 193 from the Dow Corning Company). |
| 1.5 | parts by weight of color paste. |
| 0.3 | parts by weight of water and |
| 1.8 | parts by weight of 1,1,2-trichloro-2,2,1-trifluoroethane. |

B-side Component: substantially as described in Example 13.

100 parts by weight of the A-side components and 93 parts by weight of the B-side components, corresponding to NCO-index of 100, were processed substantially as described for Example 13 into test plaques. The mold time was 10 seconds.

The mechanical properties measured on the molded articles are listed in Table IV.

COMPARATIVE EXAMPLE G

The procedures described for Example 19 were substantially followed, however, the polyester polyol prepared according to comparative Example C was used in place of the polyester polyol according to Example 10.

The mechanical properties measured on the molded article obtained are sumuarized in Table IV.

TABLE IV

Mechanical Properties of the Molded Articles Prepared According to Both Example 19 and Comparative Example G.

| Mechanical Properties | Example 19 | Comparative Example G |
|---|---|---|
| Density [g/cm$^3$] | 0.5 | 0.5 |
| Tensile strength according DIN 53 504 [N/mm$^2$] | 7 | 5 |
| Precentage Elongation at Break according DIN 53 504 [%] | 395 | 320 |
| Tear Propagation strength according to DIN 53 515 [N/mm] | 11 | 9 |
| Repeated Flexural Stress Behavior following 30,000 load cycles | | |
| Before the hydrolysis aging | ok | in order |
| After the hydrolysis aging (7 days at 70° C., 100% relative humidity) | ok | break |

The embodiments of the invention in which an exclusive privilege or property is claimed are defined as follows:

1. A polyester polyol, liquid at 25° C., containing in bonded form units having at least one of the structures selected from the group:

—O—CH$_2$—CH(CH$_3$)—CH$_2$—CH$_2$—CH$_2$—O—,

—O—CH$_2$—CH(C$_2$H$_5$)—CH$_2$—CH$_2$—O—,

—OC—CH(CH$_3$)—CH$_2$—CH$_2$—CO— and

—OC—CH(C$_2$H$_5$)—CH$_2$—CO—.

2. A polyester polyol according to claim 1 wherein said units comprise at least 10 weight percent, based on the entire weight of said polyester polyol.

3. A polyester polyol according to claim 2 wherein said units have the structure:

—OC—CH(CH$_3$)—CH$_2$—CH$_2$—CO— and

—O—CH$_2$—CH(CH$_3$)—CH$_2$—CH$_2$—CH$_2$—O
and/or

—O—CH$_2$—CH(C$_2$—H$_5$)—CH$_2$—CH$_2$—O—.

4. A polyester polyol according to claim 2 wherein said units have the structure:

—OC—CH(C₂—H₅)—CH₂—CO— and

—O—CH₂—CH(CH₃)—CH₂—CH₂—CH₂—O— and/or

—O—CH₂—CH(C₂H₅)—CH₂—CH₂—O—.

5. A polyester polyol according to claim 2 wherein said units have the structure:

—O—CH₂—CH(CH₃)—CH₂—CH₂—CH₂—O— and/or

—O—CH₂—CH(C₂H₅)—CH₂—CH₂—O—.

6. A polyester polyol according to claim 2 wherein said units have the structure:

—OC—CH(CH₃)—CH₂—CH₂—CO— and/or

—OC—CH(C₂H₅)—CH₂—CO—.

7. A polyester polyol according to claim 5 wherein said units have the structure:

—O—CH₂—CH(CH₃)—CH₂—CH₂—CH₂—O—.

8. A polyester polyol, according to claim 5 wherein said units have the structure:

—O—CH₂—CH(C₂H₅)—CH₂CH₂—O—.

9. A polyester polyol, according to claim 6 wherein said units have the structure:

—OC—CH(CH₃)—CH₂—CH₂—CO—.

10. A polyester polyol according to claim 6 wherein said units have the structure:

—OC—CH(C₂H₅)CH₂—CO—.

11. A polyester polyol according to claim 1, 2, 3, 4, 5, 6, 7, 8, 9 or 10 having:
an average functionality of from 2 to 3;
a hydroxyl number of from 25 to 400;
an acid number smaller than 10; and
a viscosity at 25° C. of from 200 to 10⁵ mPas.

12. A polyester polyol according to claim 1 prepared by polycondensation or transesterification, in the presence or absence of catalysts, of at least one aliphatic polycarboxyic acid and/or at least one aliphatic polycarboxylic acid derivative and at least one multivalent aliphatic alcohol wherein s id multivalent alcohol is 2-methyl-1,5-pentanediol,2-ethyl-1,4-butanediol, mixtures comprised of 2-methyl-1,5-pentanediol and 2-ethyl-1,4butanediol in a weight ratio of from 1:99 to 99:1, or mixtures comprised of: 2-methyl-1,5-pentanediol and/or 2-methyl-1,4-butanediol and at least one linear or branched, optionally containing ether bridges, aliphatic di-through tetravalent alcohol having a content of 2-methyl-1,5pentanediol and/or 2-ethyl-1,4-butanediol of at least 20 weight percent based on the weight of the alcohol mixture.

13. A polyester polyol according to claim 12 wherein the mixture of multivalent aliphatic alcohols is comprised of (i) from 20 to approximately 100 weight percent of 2-methyl-1,5-pentanediol and/or 2-ethyl-1,4-butanediol, and
(ii) from 80 to approximately 0 weight percent of at least one linear or branched alkanediol having from 2 to 12 carbon atoms, a polyoxyalkylenediol having a molecular weight of from 106 to 622, a linear or branched alkanetriol having from 3 to 6 carbon atoms and/or pentaerythritol, wherein the weight percents are based on the entire weight of the alcohol mixture.

14. A polyester polyol according to claim 13 wherein the mixture of multivalent aliphatic alcohols is comprised of (i) from 20 to approximately 100 weight percent of 2-methyl-1,5-pentanediol and/or 2-ethyl-1,4-butanediol, and
(ii) from 80 to approximately 0 weight percent of 1,2-ethanediol, 1,3-propanediol, 1,4-butanediol, 1,5-pentanediol, 1,6-hexanediol, diethylene glycol, dipropylene glycol, glycerine or trimethylolpropane, or a mixture comprised of at least two of these multivalent aliphatic alcohols, wherein the weight percents are based on the weight of the entire alcohol mixture.

15. A polyester polyol according to claim 12 wherein said aliphatic polycarboxylic acid or polycarboxylic acid derivative is selected from:
2-methyl glutaric acid,
2-methyl glutaric acid dimethyl ester,
2-ethyl succinic acid,
2-ethyl succinic acid-dimethyl ester,
mixtures comprised of at least two of said compounds, or mixtures comprised of 2-methyl glutaric acid, 2-methyl glutaric-dimethyl ester, 2-ethyl succinic acid and/or 2-ethyl succinic-dimethyl ester and at least one aliphatic dicarboxylic acid having from 2 to 12 carbon atoms, a cycloaliphatic dicarboxylic acid having from 6 to 20 carbon atoms and/or an aromatic dicarboxylic acid having from 8 to 20 carbon atoms and/or the corresponding dicarboxylic monoalkyl esters, dicarboxylic dialkyl esters having from 1 to 4 carbon atoms in the alkyl radical or dicarboxylic anhydrides having a content of 2-methyl glutaric acid, 2methyl glutaric-dimethyl ester, 2-ethyl succinic acid and/or 2-methyl glutaric-dimethyl ester of at least 20 weight percent based on the weight of the mixture.

16. A polyester polyol according to claim 15 wherein the mixture of polycarboxylic acids and/or polycarboxylic acid derivatives is comprised of:
from 20 to approximately 100 weight percent of 2-methyl glutaric acid, 2-methyl glutaricdimethyl ester, 2-ethyl succinic acid and/or 2-ethyl succinic-dimethyl ester; and
from 80 to approximately 0 weight percent of succinic, glutaric, adipic, or phthalic acid or a mixture comprised of at least two of said dicarboxylic acids or the corresponding dicarboxylic monoalkyl esters, dicarboxylic dialkyl esters and/or dicarboxylic anhydrides, wherein the weight percents are based on the entire weight of the mixture.

17. A process for preparing polyester polyols liquid at 25° C. which contain in bonded form units having at least one of the structures selected from the group:

—O—CH₂—CH(CH₃)—CH₂—CH₂—CH₂—O—,

—O—CH₂—CH(C₂H₅)—CH₂—CH₂—O—,

—OC—CH(CH$_3$)—CH$_2$—CH$_2$—CO— and

—OC—CH(C$_2$H$_5$)—CH$_2$—CO—.

through polycondensation or transesterification, in the presence or absence of catalysts, of at least one aliphatic polycarboxylic acid and/or at least one aliphatic polycarboxylic acid derivative and at least one multivalent aliphatic alcohol wherein said polycarboxylic acid and/or polycarboxylic acid derivative is: 2-methyl glutaric acid, 2-ethyl succinic acid, aliphatic dicarboxylic acids having from 2 to 12 carbon atoms, cycloaliphatic dicarboxylic acids having from 6 to 20 carbon atoms, aromatic dicarboxylic acids having from 8 to 20 carbon atoms, or the corresponding dicarboxylic monoalkyl esters, dicarboxylic dialkyl esters having from 1 to 4 carbon atoms in the alkyl radical or dicarboxylic acid anhydrides, or mixtures comprised of at least two of said dicarboxylic acids and/or dicarboxylic acid derivatives, and said multivalent alcohol is: 2-methyl-1,5-pentanediol, 2-ethyl-1,4-butanediol, linear or branched, optionally containing ether bridges, of di- through tetravalent aliphatic alcohols or mixtures comprised of at least two of said multivalent aliphatic alcohols provided that the starting materials used are comprised of at least one compound from the group: 2-methyl-1,5-pentanediol, 2-methyl-1,4-butanediol, 2-methyl glutaric acid 2-ethyl succinic acid or their corresponding dicarboxylic acid derivatives.

18. A process for the preparation of a polyester polyol according to claim 17 wherein the polyester polyol has an average functionality of from 2 to 3, a hydroxyl number of from 25 to 400, an acid number smaller than 10 and a viscosity at 25° C. of from 200 to $10^5$ mPas.

19. A non-cellular or cellular polyurethane or polyurethane-polyurea plastic prepared by polyisocyanate addition polymerization using a polyester polyol according to claim 1.

20. A non-cellular or cellular polyurethane or polyurethane-polyurea elastomer prepared using a polyester polyol according to claim 1.

* * * * *